Patented Feb. 25, 1930

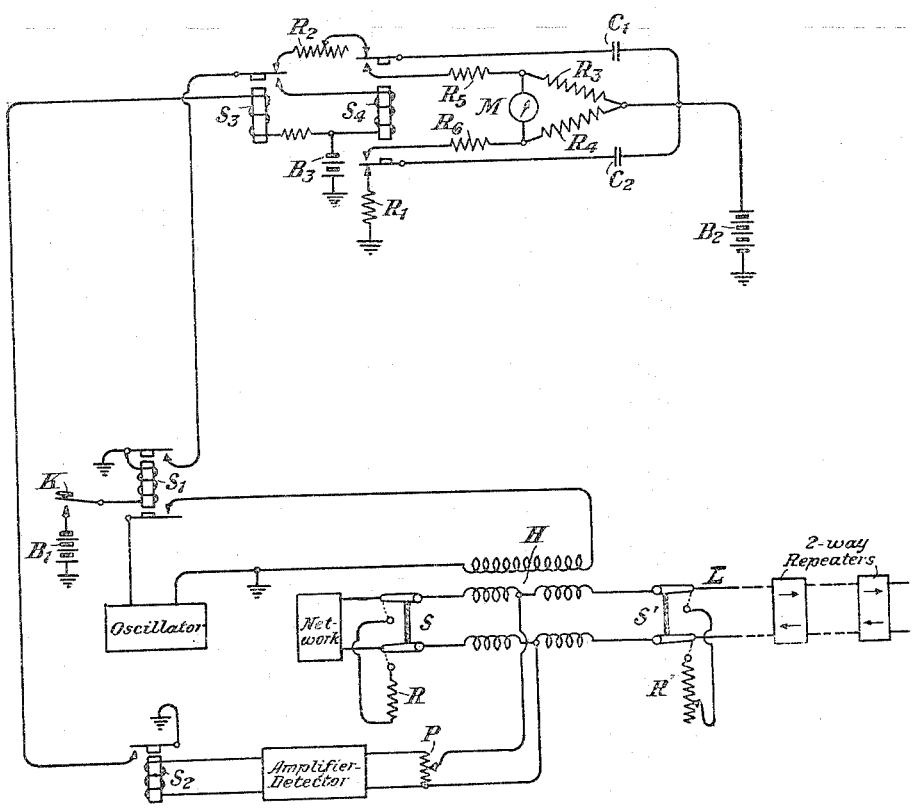

1,748,171

UNITED STATES PATENT OFFICE

ALVA B. CLARK, OF WYOMING, NEW JERSEY, ASSIGNOR TO AMERICAN TELEPHONE AND TELEGRAPH COMPANY, A CORPORATION OF NEW YORK

MEASUREMENT OF ECHOES

Application filed October 30, 1928. Serial No. 316,029.

This invention relates to the measurement of echoes in two-way transmission circuits, and more particularly to methods for measuring the magnitude and the transmission time or "delay" of echoes in long repeatered transmission circuits.

The object of the invention is the relatively accurate and simple determination of the effect of unbalances at repeater points in the class of transmission circuits defined above.

In general, the applicant, in accomplishing the above-named object, sends into the transmission line an alternating current of suitable frequency, simultaneously starts the operation of a measuring circuit, causes the returning echoes to control the operation of the measuring circuit, offsets any delay connected with the measuring circuit and determines the true echo time, and determines the magnitude of the echoes from a step in the time measuring method.

The invention will be more clearly understood when the following description of a desirable form of apparatus and of the operation thereof is read with reference to the accompanying drawing, which shows diagrammatically and in part schematically the circuits involved.

The line L is a transmission line having, as indicated, a plurality of two-way repeaters. At the measuring point the line L is balanced through the hybrid coil H by a network or artificial balancing impedance.

When the key K is operated, a circuit is closed through the battery $B_1$ and the winding of relay $S_1$, and the relay is operated. This relay operation completes a circuit through the oscillator and a winding of the hybrid coil H, and alternating current of some suitable frequency is sent from the oscillator through the hybrid coil and into the transmission line L. The operation of relay $S_1$ also completes a circuit through a battery $B_2$ and the condenser $C_1$ in the time measuring circuit (shown at the top of the drawing and to be discussed more fully hereinafter), and starts the charging of that condenser.

When the echo current, due to unbalance at some repeater point on the line L, returns to the measuring point, it enters the amplifier-detector, is rectified, and causes the operation of the relay $S_2$. It is the function of the time measuring circuit to measure the time interval between the operation of relay $S_1$, which is practically simultaneous with the sending of the current into the line from the oscillator, and the operation of relay $S_2$, which is in response to the return of the echo current.

The time measuring circuit disclosed is not in itself original with the applicant, but is shown as a suitable time measuring device and is described and discussed more fully than is necessary or desirable herein in an article by J. Herman entitled "Bridge for measuring small time intervals" and published in the issue of "The Bell System Technical Journal" for April, 1928.

The time measuring circuit is in the form of a bridge and involves certain principles of electrical balance. Two condensers $C_1$ and $C_2$ are charged from a common battery $B_2$. The condenser $C_1$ is charged through an adjustable resistance $R_2$ during the time elapsing between the operations of certain relays, to be discussed hereinafter. The condenser $C_2$ is charged through a fairly low fixed resistance $R_1$, acquires its full charge in a comparatively short space of time, and is used merely for the purpose of comparison. When relay $S_4$ is operated, the two condensers are simultaneously discharged through a circuit including the differential meter M. If the charges on the condensers are equal, the meter will, of course, show no deflection; if, however, the charges are unequal, there will be a momentary deflection, and the direction of the deflection will show whether the charge on condenser $C_1$ is higher or lower than the charge on condenser $C_2$. If now the charging and discharging steps are repeated a few times and the value of resistance $R_2$ in series with condenser $C_1$ is adjusted, the charges on the two condensers can readily be brought to equality. Then the time interval controlling the charging step can be determined from the value of resistance $R_2$.

In measuring echoes, first the amplifierdectector is adjusted to its least sensitive condition by a suitable operation of the potentiometer P. The key K is then operated repeatedly, causing spurts of alternating current to be sent into the transmission line, as described above, and the potentiometer P is operated to increase gradually the sensitiveness of the amplifier-detector—until the relay $S_2$ begins to operate. When relay $S_1$ operates in response to the closing of key K, the charging of condenser $C_1$ through resistance $R_2$ begins, as shown above. After the brief interval of the echo transmission period, the operation of relay $S_2$ closes a circuit through battery $B_3$ and the winding of relay $S_3$, and the latter relay operates. This relay operation opens the charging circuit of condenser $C_1$ and causes the operation of relay $S_4$ by completing a circuit through battery $B_3$, the winding of that relay, and the armatures of relays $S_3$ and $S_1$. When relay $S_4$ operates, the condensers $C_1$ and $C_2$ are simultaneously discharged through the differential meter circuit including the meter M and the two equal resistances $R_3$ and $R_4$. Additional resistances $R_5$ and $R_6$ are connected into the discharge circuit to limit the discharge current and prevent sparking at the relay contacts. After the discharge the meter indication is noted, the resistance $R_2$ is adjusted in connection with repeated operations of key K until the meter shows no deflection, and the time between the operation of relay $S_1$ and the operation of relay $S_2$ is determined from the value of resistance $R_2$.

In the operation of the circuits there may be errors introduced great enough to affect the accuracy of the echo time measurement. For instance, the contacts of relay $S_1$ may not close simultaneously, and an appreciable time may be required for relay $S_3$ to open the condenser charging circuit at the end of the echo delay period. The true time measurement therefore requires that additional steps be taken.

After the time between the operations of relays $S_1$ and $S_2$ has been determined as described above, switches S and S' are operated to substitute in the connections to the hybrid coil H a fixed resistance R for the balancing network and an adjustable resistance R' for the transmission line L. The resistance R should be equal to the nominal impedance of the network. With the repeated operation of key K, resistance R' is adjusted to the point at which relay $S_2$ begins to operate. The time interval between the operations of relays $S_1$ and $S_2$ is then measured again in the manner described above. Since this result represents the operation time of the circuits, regardless of the delay of echoes, it may be subtracted from the result earlier obtained to give the true transmission time of the echo currents from the measuring point into the line to the point of unbalance and back to the measuring point.

The unbalance between the adjustable resistance R' and the fixed resistance R at the termination of the adjustment of R' can now be taken as the measure of the strength of the echo the delay of which has just been determined.

These operations give the strength and time of transmission of the strongest echo returned by the transmission line. Weaker echoes, having shorter times of transmission, may now be measured by restoring the connections of the hybrid coil H to the network and the line L and increasing the sensitiveness of the amplifier-detector. If such echoes are present, the time interval between the operations of relays $S_1$ and $S_2$ will become shorter and the measuring operations described above may be repeated to measure their delay. The change of the setting of the potentiometer P gives the relative strength of the various echoes measured.

While a specific disclosure is made in the drawing and hereinabove for the purpose of illustration, it is to be understood that the true scope of the invention is not limited thereby but is determined by the appended claims.

What is claimed is:

1. The method of measuring the magnitude and delay of echoes in long repeatered circuits which consists in balancing the line at the measuring point by an impedance element, sending into the line an alternating current, simultaneously therewith beginning the storing of electrical energy, causing the return of echo currents to the measuring point to terminate the storing of electrical energy, determining the time elapsed between the beginning and the termination of the storage operation from the quantity of stored energy, substituting a variable resistance for the line and a fixed resistance for the balancing impedance element, adjusting the variable resistance so substituted to simulate the actual balance condition between the line and the balancing element, repeating the storing and time determining steps, determining the delay of echoes from the difference between the two time measurements, and determining the magnitude of echoes from the unbalance between the variable resistance substituted for the line and the fixed resistance substituted for the balancing element.

2. The method of measuring echoes in a long repeatered transmission circuit, which consists in associating the transmission circuit with a balancing network through a hybrid coil at the measuring point, sending into the transmission circuit through the hybrid coil an alternating current of predetermined frequency, causing an operation of a measuring circuit simultaneously with the sending of the alternating current, causing a subsequent operation of the measuring circuit in response to the return of an echo from the transmission circuit, determining from the measuring circuit the time elapsing between the two operations, substituting an adjustable resistance for the transmission line and a fixed resistance for the balancing network, adjusting the adjustable resistance so substituted to simulate the actual balance condition between the transmission line and the balancing network, sending an alternating current into the hybrid coil and simultaneously causing an operation of the measuring circuit, causing a subsequent operation of the measuring circuit in response to current returned from the hybrid coil, determining from the measuring circuit the time elapsing between the two operations, determining the delay of the echo returned from the transmission circuit by subtracting the second time measurement from the first time measurement, and determining the magnitude of the echo from the unbalance between the substituted adjustable and fixed resistances.

3. The method of measuring the delay of an echo in a long repeatered transmission circuit which consists in sending into the transmission circuit from the measuring point an alternating current, detecting the echo current returned over said circuit to the measuring point, causing an operation of an element of a time measuring circuit simultaneously with the sending of the current into the transmission circuit, causing an operation of a second element of the time measuring circuit in response to the detection of the returned echo current, determining the time elapsed between the two operations, determining the operation delay of the measuring circuit, and setting this delay off against the time first determined to determine the true delay of the echo in the transmission circuit.

4. The method of measuring the delay of an echo in a long repeatered transmission circuit which consists in sending into the transmission circuit from the measuring point an alternating current, detecting the echo current returned over said circuit to the measuring point, causing an operation of an element of a time measuring circuit simultaneously with the sending of the current into the transmission circuit to commence the storing of electrical energy, causing an operation of a second element of the time measuring circuit in response to the detection of the returned echo current to terminate the storing of electrical energy, determining the time elapsed between the two operations from the quantity of stored energy, determining the operation delay of the measuring circuit, and setting this delay off against the time first determined to determine the true delay of the echo in the transmission circuit.

5. The method of measuring the delay of an echo in a long repeatered transmission circuit which consists in sending into the transmission circuit from the measuring point an alternating current, detecting the echo current returned over said circuit to the measuring point, causing the beginning of the storage of electrical energy in a measuring circuit simultaneously with the sending of the current into the transmission circuit, causing the termination of the storage of electrical energy in the measuring circuit in response to the detection of the returned echo current, determining the time elapsed between the beginning and the termination of the storage operation from the quantity of the stored energy, determining the operation delay of the measuring circuit, and setting this delay off against the time first determined to determine the true delay of the echo in the transmission circuit.

In testimony whereof, I have signed my name to this specification this 24th day of October, 1928.

ALVA B. CLARK.